United States Patent
Borah et al.

(10) Patent No.: US 10,176,069 B2
(45) Date of Patent: Jan. 8, 2019

(54) QUORUM BASED AGGREGATOR DETECTION AND REPAIR

(71) Applicant: AppDynamics LLC, San Francisco, CA (US)

(72) Inventors: Gautam Borah, Fremont, CA (US); Pankaj Gupta, Sunnyvale, CA (US); Kiran Nagasubramanian, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 14/929,012

(22) Filed: Oct. 30, 2015

(65) Prior Publication Data
US 2017/0123942 A1 May 4, 2017

(51) Int. Cl.
G06F 11/00 (2006.01)
G06F 11/30 (2006.01)
G06F 11/34 (2006.01)
G06F 11/20 (2006.01)
G06F 11/07 (2006.01)
G06F 11/16 (2006.01)

(52) U.S. Cl.
CPC ...... *G06F 11/3006* (2013.01); *G06F 11/2035* (2013.01); *G06F 11/3082* (2013.01); *G06F 11/3409* (2013.01); *G06F 11/0757* (2013.01); *G06F 11/1658* (2013.01); *G06F 2201/85* (2013.01)

(58) Field of Classification Search
CPC ............ G06F 11/2007; G06F 11/3006; G06F 11/3409; G06F 11/14; G06F 11/143; G06F 11/302; G06F 2201/85; G06F 11/2035; G06F 11/3082; G06F 11/0757; G06F 11/1658
See application file for complete search history.

(56) References Cited

U.S. PATENT DOCUMENTS

| | | | |
|---|---|---|---|
| 7,509,518 B2* | 3/2009 | Bailey | G06F 11/008 707/999.101 |
| 2004/0039809 A1* | 2/2004 | Ranous | H04L 29/06 709/223 |
| 2007/0022314 A1* | 1/2007 | Erasani | G06F 11/1425 714/4.1 |
| 2008/0004841 A1* | 1/2008 | Nakamura | G06F 11/008 702/186 |
| 2010/0100587 A1* | 4/2010 | Teglovic | G06F 11/1464 709/203 |
| 2012/0210160 A1* | 8/2012 | Fuhrman | G05B 19/0428 714/4.12 |

\* cited by examiner

*Primary Examiner* — Bryce P Bonzo
*Assistant Examiner* — Anthony J Amoroso
(74) *Attorney, Agent, or Firm* — Parker Ibrahim & Berg LLP; James M. Behmke; Stephen D. LeBarron (57) ABSTRACT

The present system uses quorum based aggregator failure detection in which a failed aggregator is detected and configured. Rather than repair and roll-up of all metrics for a period of time associated with the failed aggregator, only the specific metrics that were to be processed by the failed aggregator are repaired. Once the failed aggregator is identified, the time range for the downed aggregator and keys processed by the aggregator are identified. Keys for replica aggregators associated with the identified time ranges and key values are then pulled, provided to a batch processor, and processed. At cluster roll-up task completion, a time rollup task for cluster rollup is then started.

20 Claims, 5 Drawing Sheets

QUORUM BASED AGGREGATOR DETECTION AND REPAIR

BACKGROUND OF THE INVENTION

The World Wide Web has expanded to make various services available to the consumer as online web application. A multi-tiered web application is comprises of several internal or external services working together to provide a business solution. These services are distributed over several machines or nodes, creating an n-tiered, clustered on-demand business application. The performance of a business application is determined by the execution time of a business transaction; a business transaction is an operation that completes a business task for end users of the application. A business transaction in an n-tiered web application may start at one service and complete in another service involving several different server machines or nodes. For Example, reserving a flight ticket involves a typical business transaction "checkout" which involves shopping-cart management, calling invoicing and billing system etc., involving several services hosted by the application on multiple server machines or nodes. It is essential to monitor and measure a business application to provide insight regarding bottlenecks in communication, communication failures and other information regarding performance of the services that provide the business application.

A business application is monitored by collecting several metrics from each server machine or node in the system. The collected metrics are aggregated by service or tier level and then again aggregated by the entire application level. The metric processing involves aggregation of hierarchical metrics by several levels for an n-tier business application. In a large business application environment hundreds and thousands of server machines or nodes create multiple services or tiers, each of these nodes generate millions of metrics per minute.

If there is a failure in the metric processing system, for example a downed aggregator, a significant of data could be lost if the repair isn't implemented quickly. Loss of data, both in actually collected data as well as dropped scheduling of tasks to process data, may significantly impact the perceived health of a system and the ability to determine how a system is performing. What is needed is an improved method detecting and responding to aggregator failures that minimizes data loss and task tracking.

SUMMARY OF THE CLAIMED INVENTION

The present technology uses quorum based aggregator failure detection in which a failed aggregator is detected and configured. Rather than repair and roll-up of all metrics for a period of time associated with the failed aggregator, only the specific metrics that were to be processed by the failed aggregator are repaired. Once the failed aggregator is identified, the time range for the downed aggregator and keys processed by the aggregator are identified. Keys for replica aggregators associated with the identified time ranges and key values are then pulled, provided to a batch processor, and processed. At cluster roll-up task completion, a time rollup task for cluster rollup is then started.

An embodiment may include a method for processing metrics. The method may begin by providing a group of collectors and a group of aggregators on one or more servers, wherein the group of collectors receiving metric data from a plurality of agents one or more remote servers and each of the aggregators receiving and aggregating selected metrics received from one or more collectors. A failed aggregator may be detected. A range of keys associated with a group of metrics that were to be processed by the failed aggregator may be identified and the group of metrics may be processed which are associated with the range of keys in place of the failed aggregator.

An embodiment may include a system for processing metrics. The system may include a processor, a memory and one or more modules stored in memory and executable by the processor. When executed, the one or more modules may detect a failed aggregator, identify a range of keys associated with a group of metrics that were to be processed by the failed aggregator, and process the group of metrics associated with the range of keys in place of the failed aggregator.

DETAILED DESCRIPTION

The present technology processes a large volume of real time hierarchical system metrics using distributed computing by stateless processes. The metrics processing system receives different types of hierarchical metrics coming from different sources and then aggregates the metrics by their hierarchy. The system is on-demand, cloud based, multi-tenant and highly available. The system makes the aggregated metrics available for reporting and policy triggers in real time.

The metrics aggregation system involves two different classes of stateless java programs, collectors and aggregators, which work in tandem to receive, aggregate and roll up the incoming metrics. The aggregators and collectors may be upgraded to new versions with minimal loss in data.

The present technology uses quorum based aggregator failure detection in which a failed aggregator is detected and configured. Rather than repair and roll-up of all metrics for a period of time associated with the failed aggregator, only the specific metrics that were to be processed by the failed aggregator are repaired. Once the failed aggregator is identified, the time range for the downed aggregator and keys processed by the aggregator are identified. Keys for replica aggregators associated with the identified time ranges and key values are then pulled, provided to a batch processor, and processed. At cluster roll-up task completion, a time rollup task for cluster rollup is then started.

Figure 1:
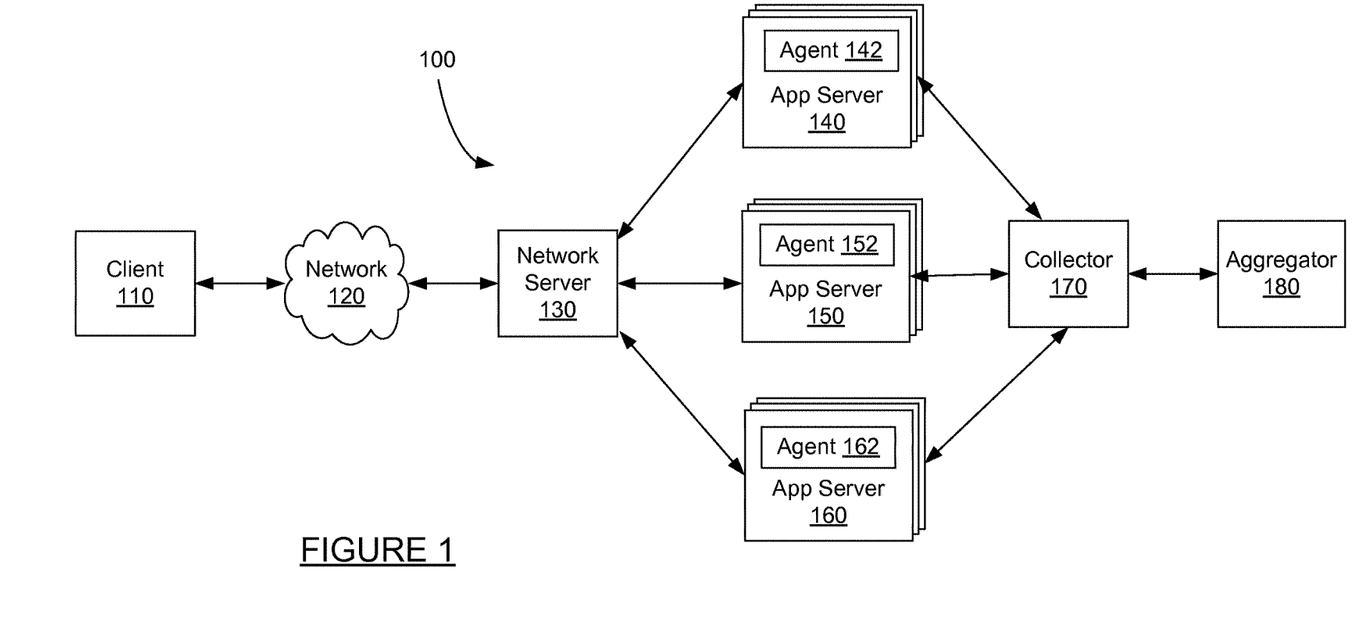
FIG. 1 is a block diagram of a system for aggregating data and handling anomalies.

FIG. 1 is a block diagram of a system for aggregating data. The system of FIG. 1 includes client 110, network server 130, application servers 140, 150 and 160, collector 170 and aggregator 180. Client 110 may send requests to and receive responses from network server 130 over network 120. In some embodiments, network server 130 may receive a request, process a portion of the request and send portions of the request to one or more application servers 140-150. Application server 140 includes agent 142. Agent 142 may execute on application server 140 and monitor one or more functions, programs, modules, applications, or other code on application server 140. Agent 142 may transmit data associated with the monitored code to a collector 170. Application servers 150 and 160 include agents 152 and 162, respectively, and also transmit data to collector 170. More detail for a system that monitors distributed business transactions and reports data to be collected and aggregated is disclosed in U.S. patent application Ser. No. 12/878,919, titled "Monitoring Distributed Web Application Transactions," filed Sep. 9, 2014, the disclosure of which is incorporated herein by reference.

Collector 170 may receive metric data and provide the metric data to one or more aggregators 180. Collector 170 may include one or more collector machines, each of which using a logic to transmit metric data to an aggregator 180 for aggregation. Aggregator 180 aggregates data and provides the data to a cache for reports to external machines. The aggregators may operation in a ring, receiving metric data according to logic that routes the data to a specific aggregator. Each aggregator may, in some instances, register itself with a presence server.

More details for collecting and aggregating metrics using a collector and aggregator is discussed in U.S. patent application Ser. No. 14/448,977, titled "Collection and Aggregation of Large Volume of Metrics, filed on Jul. 31, 2014, the disclosure of which is incorporated herein by reference.

Figure 2:
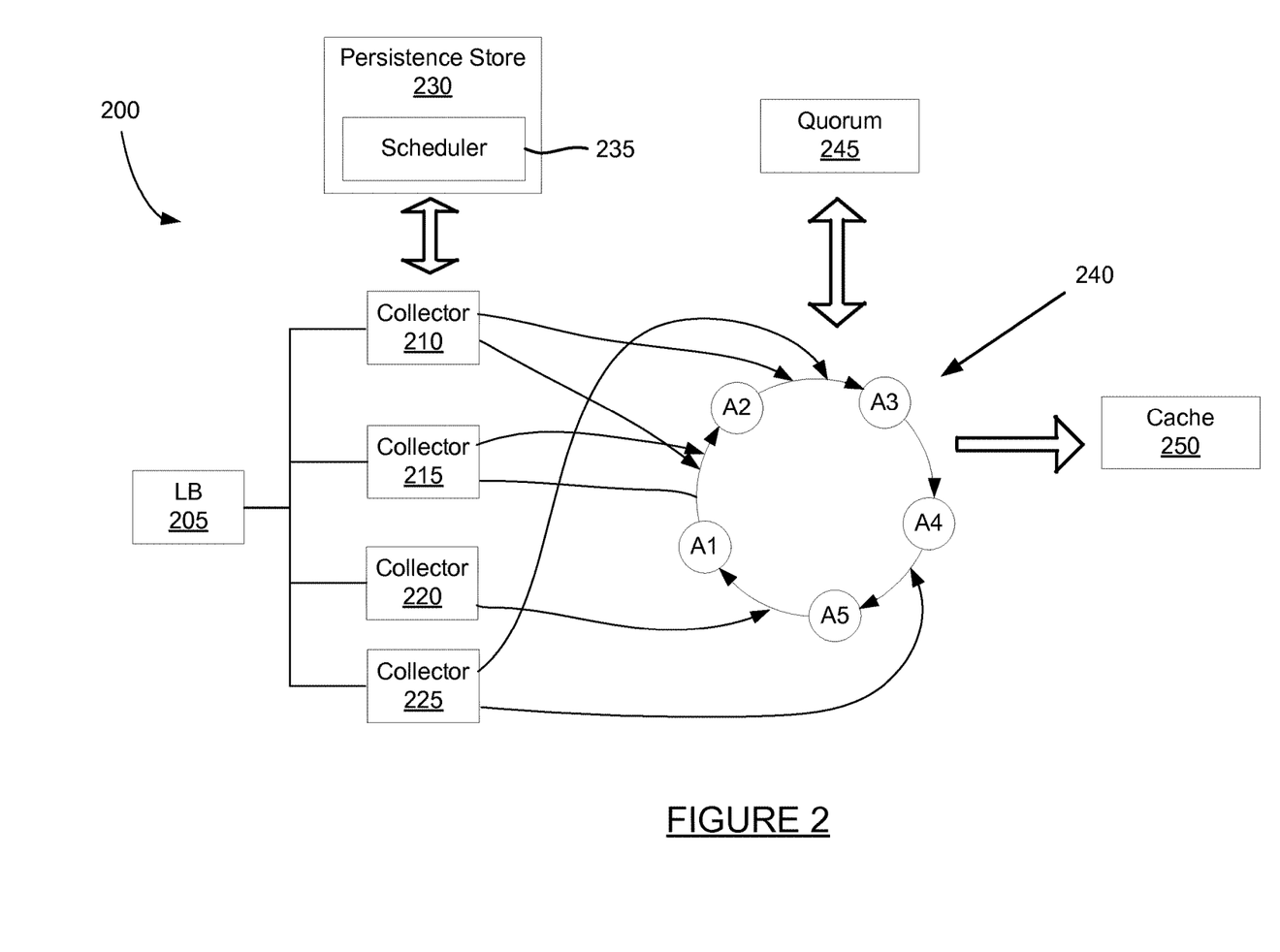
FIG. 2 is a block diagram of a collector and aggregator.

FIG. 2 is a block diagram of a collector and aggregator. The system of FIG. 2 includes load balancer 205, collectors 210, 215, 220 and 225, a persistence store 230, and aggregators 240 (A1-A5). The system of FIG. 2 also includes quorum 245 and cache 250. Agents on application servers may transmit metric data to collectors 210-225 through load balance machine 205. In some embodiments, the metrics are sent from the agent to a collector in a table format for example once per minute.

The collectors receive the metrics and use logic to route the metrics to aggregators. The logic may include determining a value based on information associated with the metric, such as a metric identifier. In some instances, the logic may include performing a hash on the metric ID. The metric may be forwarded to the aggregator based on the outcome of the hash of the metric ID. The same hash is used by each and every collector to ensure that the same metrics are provided to the same aggregator.

The collectors may each register with quorum 245 when they start up. In this manner, the quorum may determine when one or more collectors is not performing well and/or fails to register.

A persistence store 230 stores metric data provided from the collectors to the aggregators. The persistence store may include scheduler 235. Scheduler 235 may handle tasks generated and executed to resolve anomalies in the system of FIG. 2. More details for scheduler 235 are provided with respect to FIG. 3.

Each aggregator may receive one or more metric types, for example two or three metrics. The metric information may include a sum, count, minimum, and maximum value for the particular metric. An aggregator may receive metrics having a range of hash values. The same metric type will have the same hash value and be routed to the same aggregator. An aggregator may become a coordinator. A coordinator may check quorum data and confirm persistence was successful.

Once aggregated, the aggregated data is provided to a cache 250. Aggregated metric data may be stored in cache 250 for a period of time and may eventually be flushed out. For example, data may be stored in cache 250 for a period of eight hours. After this period of time, the data may be overwritten with additional data.

Figure 3:
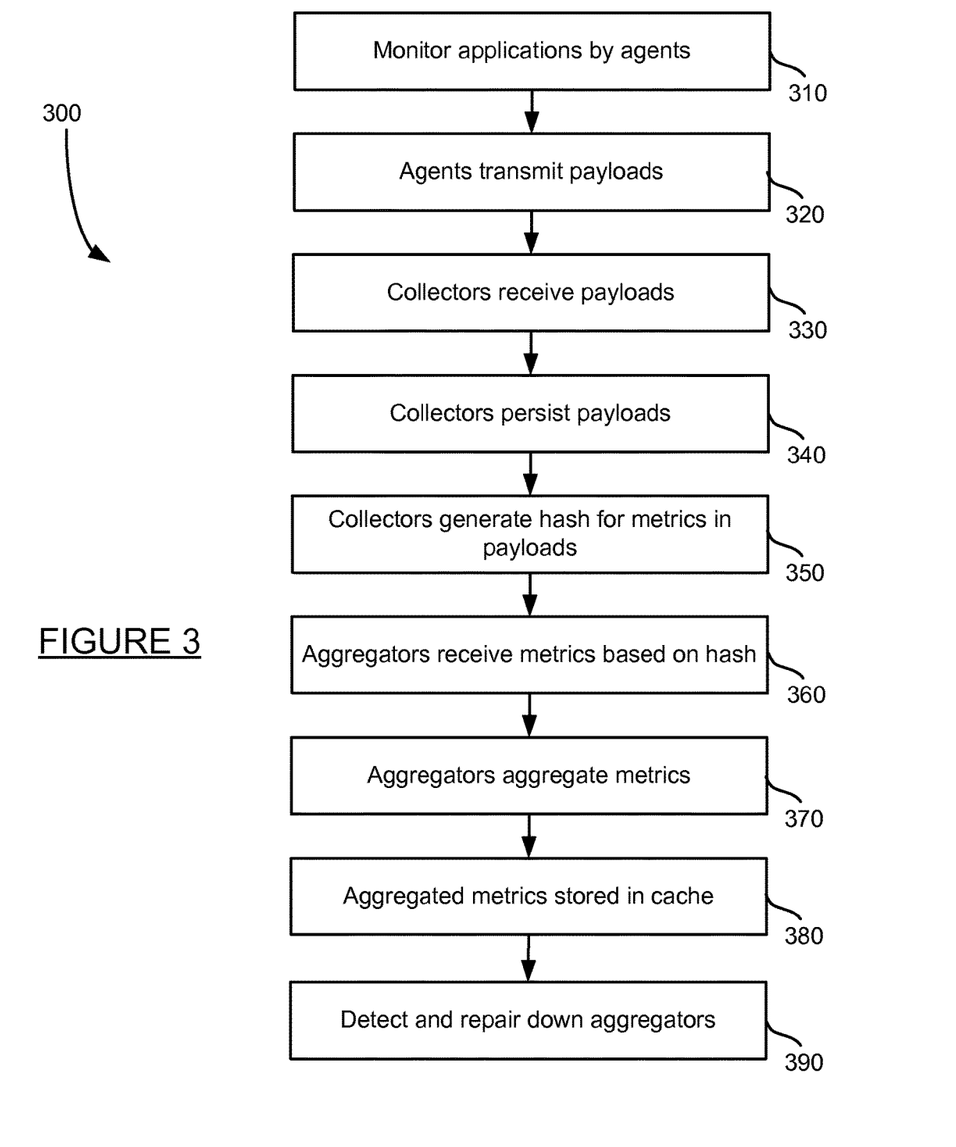
FIG. 3 is a method for collecting and aggregating metrics.

FIG. 3 is a method for collecting and aggregating metrics. First, applications are monitored by agents at step 310. The agents may collect information from applications and generate metric data. The agents may then transmit payloads to one or more collectors at step 320. The payloads may include metric information associated with the applications and other code being monitored by the particular agent. The payloads may be sent periodically from a plurality of agents to one or more collectors.

One or more collectors may receive the payloads at step 330. In some embodiments, a collector may receive an entire payload from an agent. The collectors persist the payload at step 340. To persist the payload, a collector may transmit the payload to a persistence store 230.

A collector may generate a hash for metric data within the payload at step 350. For example, for each metric, the collector may perform a hash on the metric type to determine a hash value. The same hash is performed on each metric by each of the one or more collectors. The metrics may then be transmitted by the collectors to a particular aggregator based on the hash value. Forwarding metric data to a particular aggregator of a plurality of aggregator is an example of the consistent logic that may be used to route metric data to a number of aggregators. Other logic to process the metric data may be used as well as long as it is the same logic applied to each and every metric.

The aggregators receive the metrics based on the hash value at step 360. For example, each aggregator may receive metrics having a particular range of hash values, the next aggregator may receive metrics having a neighboring range of hash values, and so on until a ring is formed by the aggregators to handle all possible hash values.

The aggregators then aggregate the metrics at step 370. The metrics may be aggregated to determine the total number of metrics, a maximum, a minimum, and average value of the metric. The aggregated metrics may then be stored in a cache at step 380. A controller or other entity may retrieve the aggregated metrics from the cache for a limited period of time.

Failed aggregators may be detected and repaired at step 390. Detecting an anomaly may include identifying time ranges and key ranges associated with the downed aggregator and repairing only that data. More detail for detecting and repairing downed aggregator and rolling up data is discussed with respect to the method of FIG. 4.

Figure 4:
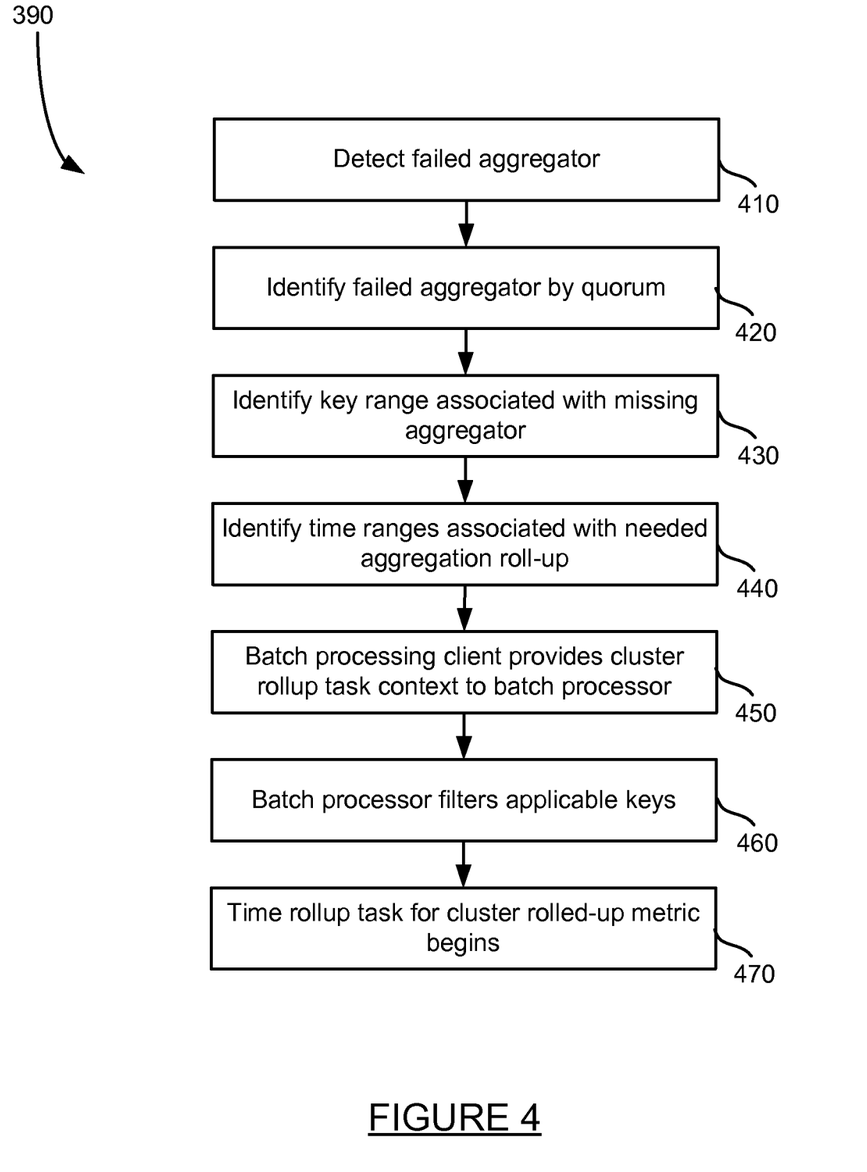
FIG. 4 is a method for detecting and repairing failed aggregators.

FIG. 4 is a method for detecting and repairing failed aggregators. The method of FIG. 4 provides more detail for step 390 the method of FIG. 3. First, a failed aggregator may be detected at step 410. In some instances, each aggregator may register itself with a quorum, and continually checks in with the quorum. Each check-in eventually expires after a period of time, such as one minute. When an aggregator fails, it will not continue to check in, and the last check-in will eventually expire. The quorum is able to detect timeouts and remove aggregators from the aggregator list when a particular aggregator times out.

Failed aggregators are identified by the quorum at step 420. The quorum may compare a previous list of aggregators to the current list of aggregators that is missing the down aggregator. By comparing these lists, the quorum may identify exactly which aggregator is missing.

Key ranges associated with the missing aggregator are identified at step 430. Each aggregator is associated with a key range for which it handles metrics to aggregate and roll up. In some instances, a key for a metric may be determined based on where the metric is from, what the metric is, and when the metric was generated. For example, a metric key may be constructed from a tier identifier that sends the metric, a metric identifier, and a time stamp identifying when the metric was generated. Each aggregator is part of a consistent hash ring, and is assigned a specific range of hashed key values to handle. The range of hash key values for the downed aggregator is identified at step 430.

A time range associated with the downed aggregator is identified at step 440. The time will include the time at which the aggregator went down as well as a surrounding time window. For example, metrics may be aggregated and rolled up by an aggregator in 10 minute windows. If the aggregator was detected to fail within the first five minutes of the 10 minute window, the identified time ranges would include the current window and the previous 10 minute window. If the aggregator was detected to go down within the last five minutes of the current window, the identified time range would include the current window and the next 10 minute window. It is during these selected windows that aggregation roll up of the metrics for the failed aggregator is performed.

A batch processing client may provide a cluster roll up task context to the batch processor at step 450. The batch processing client may retrieve keys for replica aggregators that satisfy the identified time ranges and key ranges. In some instances, each aggregator includes a number of replica aggregators. Metrics received by the aggregator are also received by one or more of the replica aggregators. By associating a plurality of replica aggregators with a normal aggregator, key values received by the downed aggregator may be accessed based on the replica aggregators which were also deemed to receive the key values. The cluster roll up task context includes the key ranges, time ranges, and replicator aggregator information.

A batch processor filters the applicable keys at step 460. Batch processor may go through each and every key, each of which is associated with a received metric, and process the metric as part of repairing any damage that might have been done by data not received by the down aggregator. The keys received will be the only those associated with a particular aggregator for the particular period of time, which are also associated and retrieved with respect to the replica aggregators. This prevents unnecessary metric processing and is more efficient than processing all metrics received for a particular time window. After processing and filtering the applicable keys, a time roll up task for a cluster rolled up metric begins at step 470. The identified keys from step 460 are rolled up and process further to complete the damage repair process.

Figure 5:
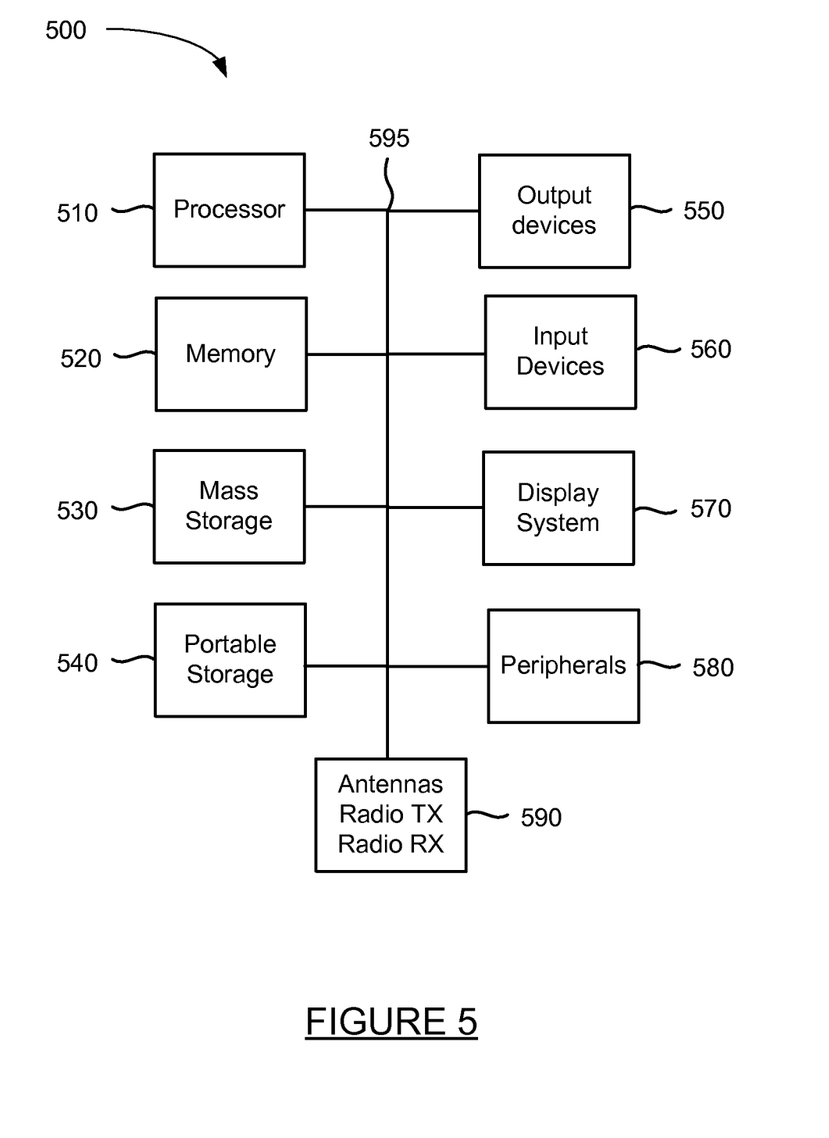
FIG. 5 is a block diagram of a system for implementing the present technology.

FIG. 5 is a block diagram of a system for implementing the present technology. System 500 of FIG. 5 may be implemented in the contexts of the likes of client computer 110, servers 130, 140, 150 and 160, collector(s) 170, and aggregator(s) 180. The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive, an optical disk drive, a flash drive, or other device, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a floppy disk, compact disk or Digital video disc, USB drive, memory card or stick, or other portable or removable memory, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device. Display system 570 may also receive input as a touch-screen.

Peripherals 580 may include any type of computer support device to add additional functionality to the computer system. For example, peripheral device(s) 580 may include a modem or a router, printer, and other device.

The system of 500 may also include, in some implementations, antennas, radio transmitters and radio receivers 590. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
registering, at a device in a computer network, a group of collectors in the computer network and a group of aggregators in the computer network, wherein the group of collectors receive metric data from a plurality of agents on one or more remote servers, and wherein each of the aggregators receive different particular types of metrics selected by the one or more collectors based on a hash that is applied to each aggregator in the group of aggregators and aggregate the selected metrics;
determining, by the device, whether each registered aggregator in the group of aggregators has checked-in with the device within a set period of time by comparing a current list of aggregators that checked-in during the set period of time to a list of aggregators that checked-in during the previous set period of time;
in response to determining that a particular aggregator has not checked-in with the device within the set period of time, identifying the particular aggregator as failed;
in response to identifying the particular aggregator as failed, identifying a range of keys associated with the selected metrics which the particular aggregator is configured to handle and a time range associated with when the particular aggregator failed; and
based on the identified range of keys and identified time range, repairing, by the device, data associated with only the identified range of keys and identified time range, wherein only specific selected metrics that were to be processed by the failed aggregator are repaired.

2. The method of claim 1, wherein the particular aggregator is identified by failing to check in with a logical quorum.

3. The method of claim 1, wherein each key is generated from machine information and a time stamp.

4. The method of claim 1, the method further comprising identifying a time range during which the group of metrics was to be processed by the particular aggregator.

5. The method of claim 4, wherein the time range during which the group of metrics was to be processed by the particular aggregator includes a current time window and a neighboring time window.

6. The method of claim 1, wherein the group of metrics associated with the particular aggregator are also associated with one or more replica aggregators, and wherein the one or more replica aggregators process the group of metrics not processed by the particular aggregator.

7. The method of claim 1, wherein the repair of data includes:
causing a batch processing client to:
retrieve keys from the one or more replica aggregators that satisfy the identified range of keys and identified time range; and
process the one or more group of metrics based on the retrieved keys.

8. A tangible non-transitory computer readable medium storing program instructions that cause a computer to execute a process, the process comprising:
registering, at a device in a computer network, a group of collectors in the computer network and a group of aggregators in the computer network, wherein the group of collectors receive metric data from a plurality of agents on one or more remote servers, and wherein each of the aggregators receive different particular types of metrics selected by the one or more collectors based on a hash that is applied to each aggregator in the group of aggregators and aggregate the selected metrics;
determining, at the device, whether each registered aggregator in the group of aggregators has checked-in with the device within a set period of time by comparing a current list of aggregators that checked-in during the set period of time to a list of aggregators that checked-in during the previous set period of time;
in response to determining that a particular aggregator has not checked-in with the device within the set period of time, identifying, at the device, the particular aggregator as failed;
in response to identifying the particular aggregator as failed, identifying, at the device, a range of keys associated with the selected metrics which the particular aggregator is configured to handle and a time range associated with when the particular aggregator failed; and
based on the identified range of keys and identified time range, repair data associated with only the identified range of keys and identified time range, wherein only specific selected metrics that were to be processed by the failed aggregator are repaired.

9. The tangible non-transitory computer readable medium of claim 8, wherein the particular aggregator is identified by failing to check in with a logical quorum.

10. The tangible non-transitory computer readable medium of claim 8, wherein each key is generated from machine information and a time stamp.

11. The tangible non-transitory computer readable medium of claim 8, the process further comprising identifying a time range during which the group of metrics was to be processed by the particular aggregator.

12. The tangible non-transitory computer readable medium of claim 11, wherein the time range during which the group of metrics was to be processed by the particular aggregator includes a current time window and a neighboring time window.

13. The tangible non-transitory computer readable medium of claim 8, wherein the group of metrics associated with the particular aggregator are also associated with one or more replica aggregators, and wherein the one or more replica aggregators process the group of metrics not processed by the particular aggregator.

14. An apparatus comprising:
one or more network interfaces to communicate with a computer network;
a processor coupled to the one or more network interfaces and configured to execute a process; and
a memory configured to store program instructions which include the process executable by the processor, the process configured to:
register a group of aggregators in the computer network, wherein each of the aggregators receive different particular types of metrics selected by the one or more collectors based on a hash that is applied to each aggregator in the group of aggregators and aggregate the selected metrics,
determine whether each registered aggregator in the group of aggregators has checked-in with the device within a set period of time by comparing a current list of aggregators that checked-in during the set period of time to a list of aggregators that checked-in during the previous set period of time, identifying the particular aggregator as failed in response to determining that a particular aggregator has not checked-in with the device within the set period of time, identify a range of keys associated with the selected metrics which the particular aggregator is configured to handle and a time range associated with when the particular aggregator failed in response to identifying the particular aggregator as failed, and based on the identified range of keys and identified time range, repair data associated with only the identified range of keys and identified time range, wherein only specific selected metrics that were to be processed by the failed aggregator are repaired.

15. The apparatus of claim 14, wherein the particular aggregator is identified by failing to check in with a logical quorum.

16. The apparatus of claim 14, wherein each key is generated from machine information and a time stamp.

17. The apparatus of claim 14, the process further configured to:

identify a second time range during which the group of metrics were to be processed by the particular aggregator.

18. The apparatus of claim 17, wherein the second time range includes a current time window and a neighboring time window.

19. The apparatus of claim 17, wherein the group of metrics associated with the particular aggregator are also associated with one or more replica aggregators, and wherein the one or more replica aggregators process the group of metrics not processed by the particular aggregator.

20. The apparatus of claim 19, wherein the repair of data includes:

causing a batch processing client to:

retrieve keys from the one or more replica aggregators that satisfy the identified range of keys and identified time range; and process the one or more group of metrics based on the retrieved keys.

\* \* \* \* \*